Sept. 26, 1939.　　　　E. S. RIDLER ET AL　　　　2,173,916
MANUFACTURE OF SULPHURIC ACID
Filed Nov. 19, 1937
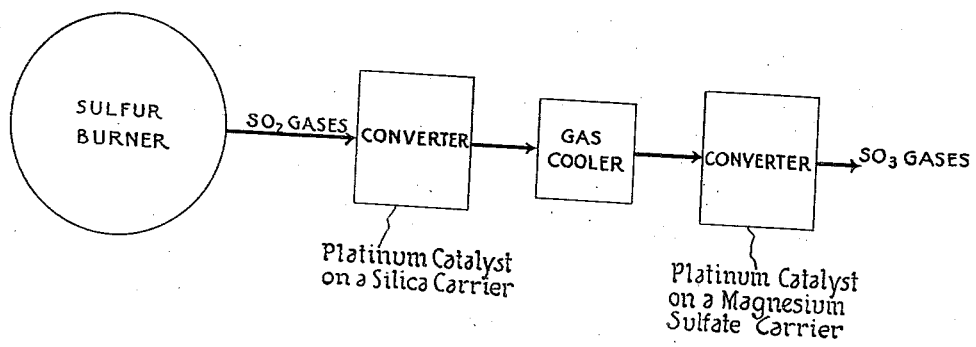
Inventors
Earl S. Ridler And,
John F. W. Schulze Deceased,
By, Henry L. Schulze, Administrator.
BY
ATTORNEY Patented Sept. 26, 1939

2,173,916

UNITED STATES PATENT OFFICE 2,173,916

MANUFACTURE OF SULPHURIC ACID

Earl S. Ridler, Bellevue, Del., and John F. W. Schulze, deceased, late of Cleveland, Ohio, by Henry L. Schulze, administrator, Yonkers, N. Y., assignors to E. I. du Pont de Nemours & Company, Wilmington, Del., a corporation of Delaware Application November 19, 1937, Serial No. 175,408

2 Claims. (Cl. 23—175)

This invention relates to contact processes for the catalytic oxidation of sulphur dioxide and is more particularly directed to processes wherein sulphur dioxide is contacted with a platinum catalyst carried on a silica carrier and, after partial conversion, is further oxidized with a platinum catalyst on a magnesium sulphate carrier.

Sulphur dioxide produced in a customary manner, for instance by burning brimstone, contains impurities which adversely affect certain catalysts. These catalyst poisons such as arsenic compounds, hydrochloric acid, and fluorides are particularly detrimental to the operation of platinum catalysts.

It has been proposed by others to convert the catalyst poisons in a sulphur dioxide-containing gas to an inactive or non-deleterious form whereupon the sulphur dioxide-containing gas would not be deleterious to a platinum catalyst. As shown in the Merriam Patent 1,965,963, a vanadium catalyst is used to remove or render innocuous those catalyst poisons which would otherwise impair the efficiency of a platinum catalyst subsequently used.

This proposal is subject to the disadvantage that vanadium being inherently a high temperature catalyst must be used at high temperatures to secure maximum conversion, and internal heat exchange converters are ordinarily required for best operation. Moreover, a low overall conversion results for a two-stage contact conversion system when a sequence using first vanadium and then platinum is employed.

We have found that catalyst poisons in gas mixtures containing sulphur dioxide apparently become less deleterious with an increase in the sulphur trioxide content of the gas mixture. After a partial conversion of a sulphur dioxide-containing gas the effects of catalyst poisons on a platinum catalyst become much less marked.

It is not necessary, therefore, to remove or modify catalyst poisons with the first converter. It is only necessary that the first converter be insensitive to thermal inactivation and that it operate with efficiency despite the presence of catalyst poisons. A second converter must cooperate with such a first converter and must have high efficiency in the presence of sulphur trioxide.

According to our invention a gas mixture containing sulphur dioxide is first contacted with a platinum catalyst on a silica carrier and after partial conversion is subsequently contacted with a platinum catalyst on a magnesium sulphate carrier.

The sequence of operations followed according to the processes of our invention will immediately be apparent by reference to the accompanying drawing which illustrates a typical embodiment of our invention.

In the drawing it is shown that sulphur dioxide-containing gases from a sulphur burner are led to a first converter which contains a platinum catalyst on silica carriers. The converter is of the adiabatic or so-called autothermal type and the effluent gases from the converters are cooled in a suitable heat exchange as is the custom. The cool gases are then led into a second adiabatic converter which contains a platinum catalyst on a magnesium sulphate carrier. Effluent gases from the second converter are cooled and absorbed in customary manner.

In a first converter in a catalytic process according to our invention it is important that the catalyst be relatively unaffected by high temperatures and poisons and that under the demanding conditions of a first converter operation it have a long life and a high and relatively undiminishing efficiency. Platinum on a silica carrier is such a catalyst.

The platinum masses on silica carriers used in a first converter according to our invention may be prepared in any suitable manner. Silica carriers such as those shown, for instance, in the Patrick Patents 1,577,189, 1,683,694, and 1,695,740 may be used. Preferably, however, we employ a silica gel carrier such as that shown in the Ridler Patent 2,071,987.

In a typical installation using a platinized silica gel carrier as shown in the Ridler patent a seventy-five per cent conversion was obtained immediately after installation and after eight months of operation the catalyst was still giving a conversion of between seventy and seventy-two per cent.

In a second converter it is necessary that a catalyst of high efficiency be used so that the over-all efficiency may be as high as possible. The catalyst must not only have a high efficiency for the conversion of sulphur dioxide to sulphur trioxide but must have a high efficiency for such conversion of sulphur dioxide despite the presence of sulphur trioxide. As has been indicated, it is not necessary that the catalyst used be highly insensitive to poisons and we have found that in the combination of steps of our invention a platinized magnesium sulphate catalyst is ideally adapted for our purposes.

Any suitable magnesium sulphate carrier platinized in suitable manner may be used. We may, for instance, use carriers prepared as in the Perry Patent 1,914,458, the Perry Patent 1,914,835, or the Perry and Ridler Patent 2,031,787. Specifically, we prefer to use a magnesium sulphate carrier including iron and aluminum as shown in the said Perry and Ridler patent.

Using a platinized magnesium sulphate catalyst in the second of a pair of contact converters according to our invention, a typical installation had an overall conversion of about 97.0 per cent when the installation was made. After a year and a half of operation the overall conversion was 96.4 per cent.

For purposes of comparison a platinized silica mass using the same amount of platinum was used in a second converter in lieu of the platinized magnesium sulphate. At the beginning of operations the overall efficiency was 94.7 per cent, and after a year and a half was 94.4 per cent.

It will be seen that while when magnesium sulphate was used in the second converter the drop in efficiency over a continuous operation of a year and a half was slightly greater, the overall efficiency was much higher.

For further purposes of comparison it is noted that instead of using platinized silica in the first converter, an attempt was made to use a platinized magnesium sulphate. In one typical installation the first converter efficiency was seventy-eight to eighty per cent at the start. After six months the conversion had dropped to fifty to fifty-five per cent. In a second typical installation, the efficiency at the start was seventy-six per cent and after one year was forty per cent.

While we have shown certain specific processes, it will be understood that considerable variation may be made without departing from the spirit of our invention. A sulphur dioxide-containing gas from any suitable source may be used and any desired purification step may be interposed.

The converters may be of any suitable type, either adiabatic or of heat exchange construction. It will also be apparent that more than two converters may be used in which case it would be preferable for all converters after the first to use platinized magnesium sulphate.

Following the processes of our invention, one is enabled to use the high efficiency platinum catalyst in all conversion units and at low cost there is obtained a catalyst set-up of long life and high overall efficiency.

While we have shown certain illustrative processes, it will be understood that one skilled in the art without departing from the spirit of our invention may readily devise numerous processes in which a gas mixture containing sulphur dioxide is first contacted with a platinized silica catalyst and after partial conversion is contacted with a platinized magnesium sulphate catalyst.

We claim:

1. In a process for the catalytic conversion of sulphur dioxide to sulphur trioxide, the steps comprising passing a gas mixture containing sulphur dioxide, oxygen, and substances such as arsenic compounds, by hydrochloric acid, and fluorides which are deleterious to catalyst operation in contact with a platinized silica catalyst and, after partial oxidation, passing the gas mixture into contact with a platinized magnesium sulphate catalyst.

2. In a process for the catalytic conversion of sulphur dioxide to sulphur trioxide, the steps comprising passing a gas mixture containing sulphur dioxide and oxygen in contact with a platinum catalyst carried on a silica gel carrier and, after partial oxidation, passing the gas mixture into contact with the platinum catalyst carried on a magnesium sulphate carrier.

EARL S. RIDLER.
HENRY L. SCHULZE,
Administrator for the Estate of John F. W. Schulze, Deceased.

CERTIFICATE OF CORRECTION.

Patent No. 2,173,916. September 26, 1939.

EARL S. RIDLER, ET AL.

It is hereby certified that error appears in the printed specification of the above numbered patent requiring correction as follows: Page 2, second column, line 26, claim 1, strike out the word "by"; and that the said Letters Patent should be read with this correction therein that the same may conform to the record of the case in the Patent Office.

Signed and sealed this 5th day of December, A. D. 1939.

Henry Van Arsdale,
Acting Commissioner of Patents.

(Seal)